May 2, 1939.　　　A. C. LINDGREN　　　2,156,570
LIFT MECHANISM FOR TRACTOR ATTACHED IMPLEMENTS
Filed July 3, 1937　　　3 Sheets-Sheet 1
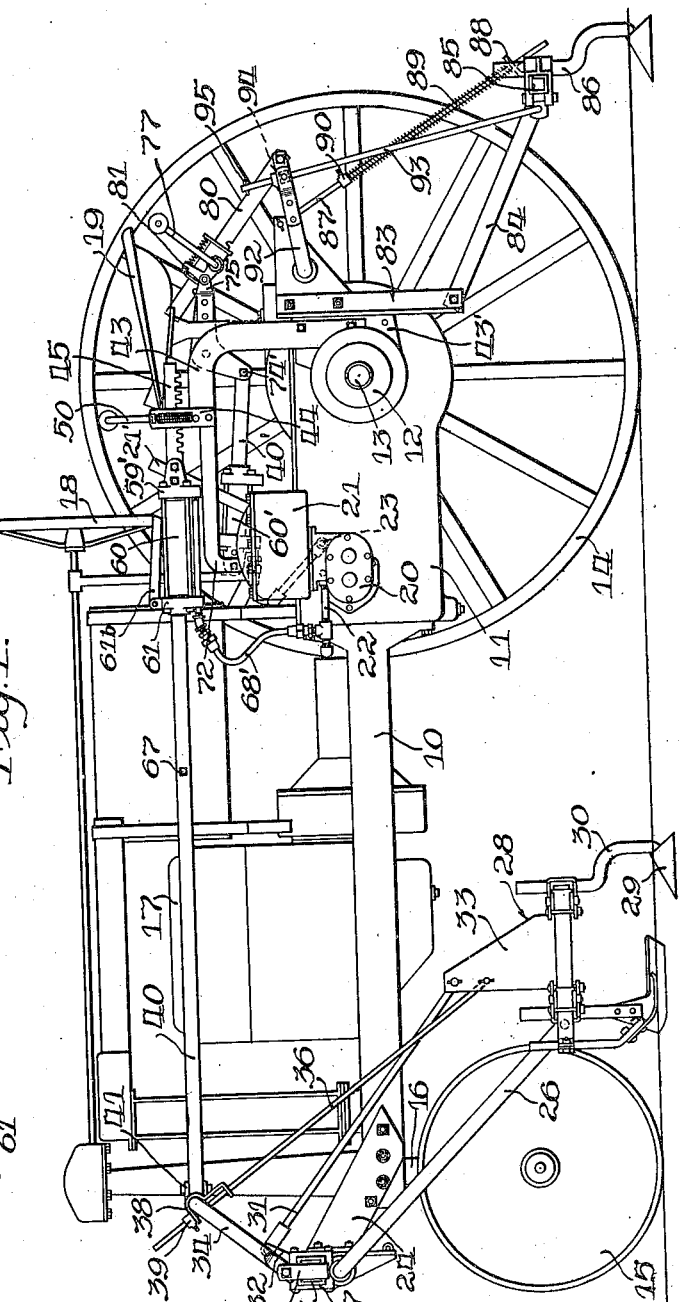
Inventor
Alexus C. Lindgren
By V. F. Lavagne
Att'y.

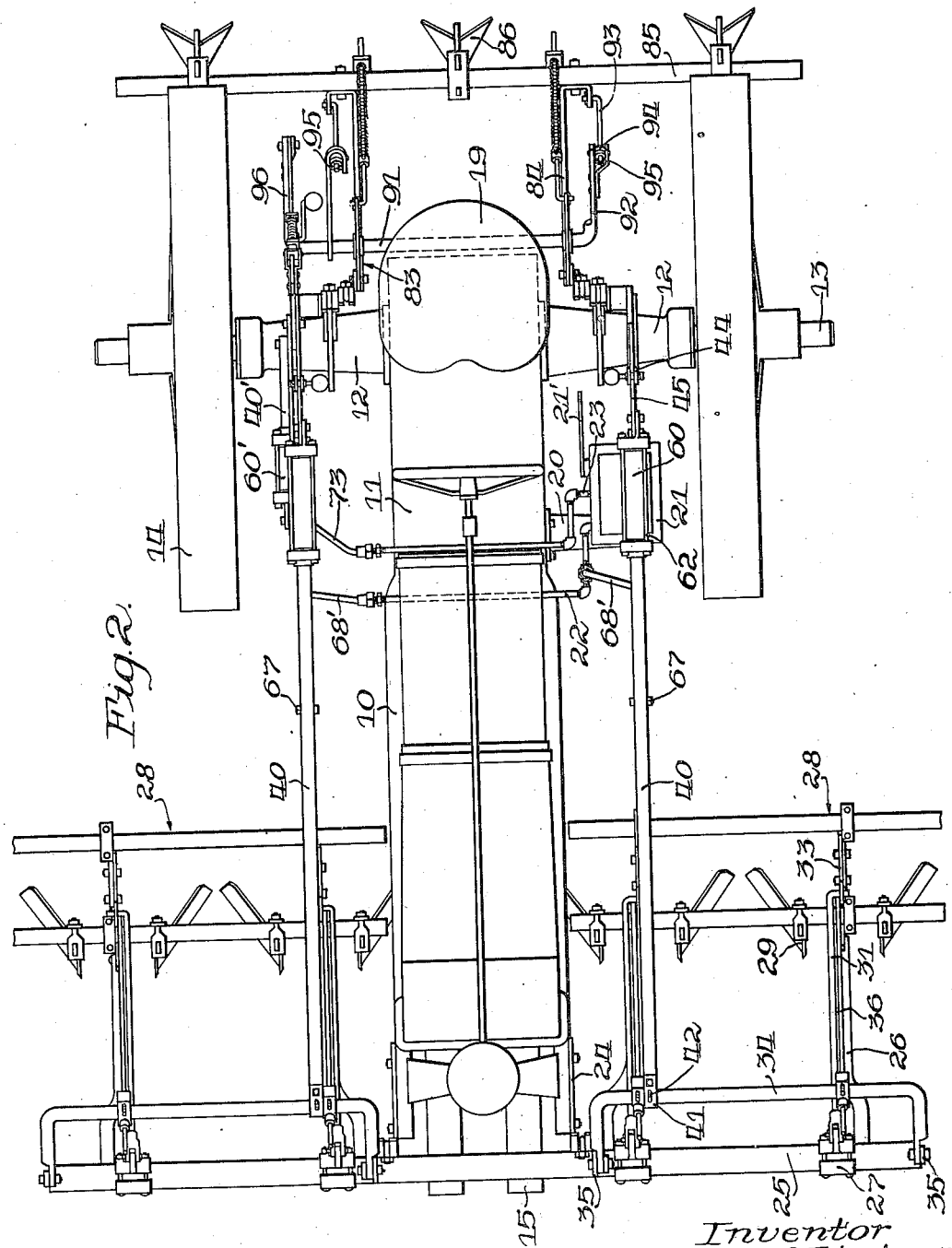

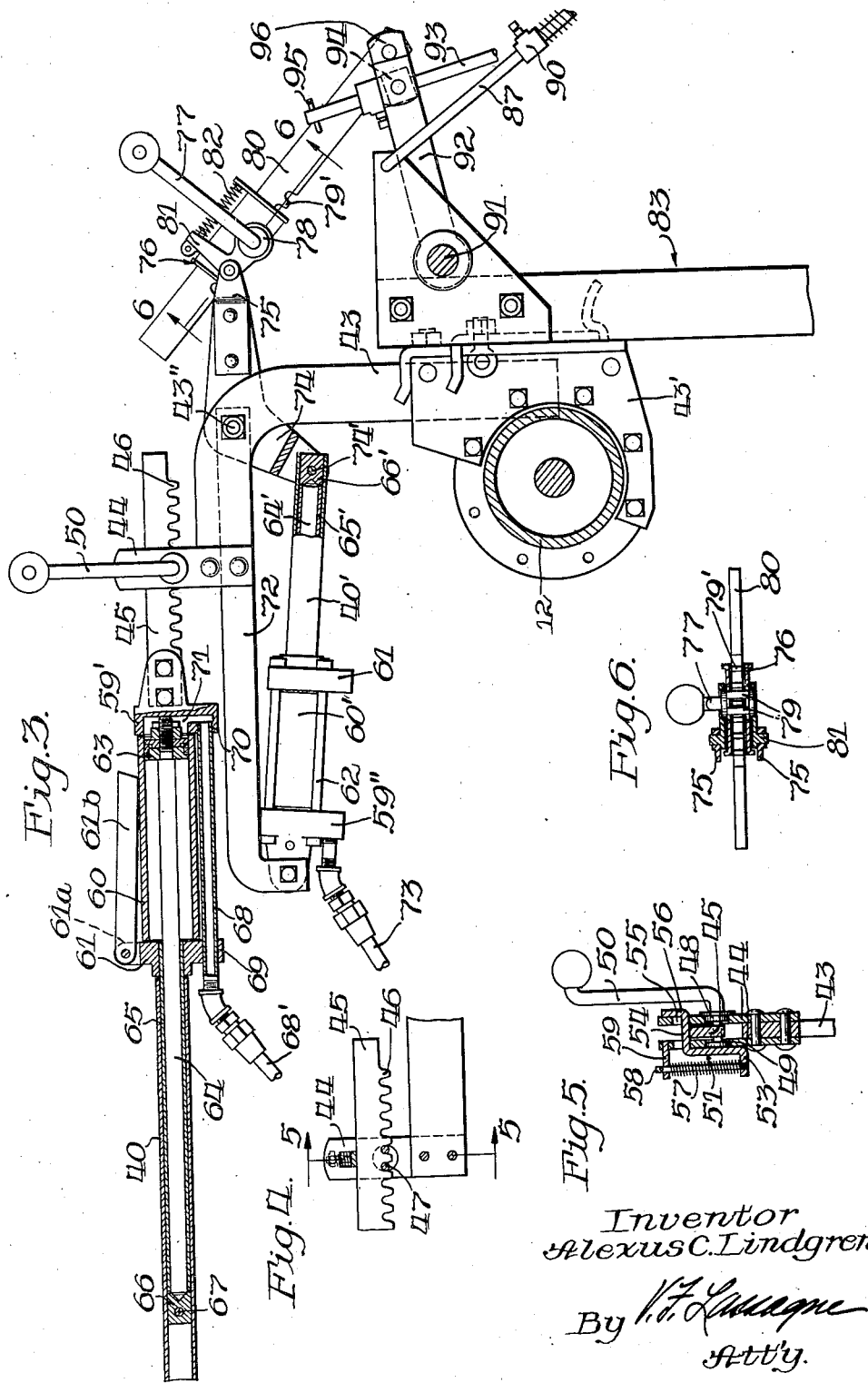

Patented May 2, 1939

2,156,570

UNITED STATES PATENT OFFICE 2,156,570

LIFT MECHANISM FOR TRACTOR ATTACHED IMPLEMENTS

Alexus C. Lindgren, Chicago, Ill., assignor to International Harvester Company, a corporation of New Jersey Application July 3, 1937, Serial No. 151,803

28 Claims. (Cl. 97—50)

This invention relates to power lift devices for tractor attached implements. More specifically it relates to hydraulic power lift devices for tractor mounted implements arranged at the front and at the rear of the tractor.

The fundamental object of the invention is to provide an improved and simplified lifting mechanism for raising implements at opposite sides of the tractor and for adjusting the working depth thereof.

A more specific object is the provision of an improved power extensible linkage for adjusting the vertical height of implements connected to a tractor.

Another important object is the provision of manually operable depth adjusting means operating independently of the power lift mechanism.

Another more specific object is the provision of an improved direct acting hydraulic cylinder designed to minimize the collection of dirt due to oil seepage.

The above objects and others, which will be apparent from the detailed description to follow, are accomplished by utilizing direct acting cylinders formed as a part of an extensible lifting linkage. In the implement illustrated, a lifting linkage is provided at each side of the tractor extending from the forward part of the tractor, where an implement to be lifted is connected, to the rear portion of the tractor. Means including a hydraulic pump operated by the engine of the tractor are provided for delivering liquid to the lifting cylinders at each side of the tractor. To provide for manual depth adjustment independent of the power lift mechanism, the rear ends of the lifting linkages are formed as racks. Manually operable, irreversible mechanisms are provided for adjusting the longitudinal position of the racks relative to their supports on the tractor. The mechanism utilized is of a special construction particularly adapted for such adjustments, as it may be operated with a step-by-step movement, there being two steps to each revolution of a hand crank. A rearwardly located implement is also provided on the tractor with a separate lifting cylinder and an independent manually operated depth adjusting mechanism.

In the drawings,

Figure 1 is a side elevation of a tractor and a cultivator mounted thereon, showing the implements in ground engaging position with the adjacent drive wheel of the tractor removed to better show the lifting mechanisms;

Figure 2 is a plan view of the same structure shown in Figure 1;

Figure 3 is an enlarged view of both the power lifting mechanism and the manual depth adjusting mechanisms on an enlarged scale. The hydraulic cylinder and its connection with the lifting linkage is broken away in section to better show the construction;

Figure 4 is an enlarged detail of the manually operable adjusting mechanism, being a vertical section to show the engagement of the operating pinion with the rack;

Figure 5 is a sectional view taken on the line 5—5 of Figure 4;

Figure 6 is a section taken on the line 6—6 of Figure 3 illustrating the rear depth adjusting mechanism; and, Figure 7 is a fragmentary side elevation of a portion of the lifting linkage, showing the latch mechanism.

A conventional tractor of the general purpose type has been illustrated. Insofar as the present invention is concerned, only a general discussion of the tractor will be necessary to explain the implement connections and the lifting mechanism therefor.

Referring to Figures 1 and 2, the tractor illustrated has a main frame including side frame members 10 and a rear casing 11, which houses the transmission of the tractor and the final drive mechanism. Rear axle housings 12 connected to the casing 11 and extending laterally therefrom support the axles 13 on which drive wheels 14 are mounted. Steerable front wheels 15 are supported by a steering column 16. An engine 17 is indicated, from which power is obtained for driving the tractor. A steering wheel 18 is provided for steering the tractor. An operator's seat 19 is shown at the rear of the tractor.

A hydraulic pump casing 20 is shown as being secured to one side of the casing 11. The pump is adapted to be driven by an element of the transmission which is in continuous operation when the engine is running. A control valve casing 21 with an actuating lever 21' projecting therefrom is mounted on the pump casing 20. The details of the hydraulic pump and the control valve therefor have not been shown, as any valve mechanisms for governing admission of fluid to the several cylinders may be utilized. An outlet pipe 22 from the pump casing is shown for delivering liquid under pressure to certain of the lifting cylinders. A second pipe 23 communicating with the front pipe is illustrated as providing means for delivering liquid to the lifting cylinder for the implements mounted at the rear.

At the front end of the tractor, forwardly and upwardly extending attaching plates 24 provide means for rigidly mounting a transverse draft member in the form of a bar 25 square in cross-section. Said bar is rigidly secured to the plates 24 by any suitable means. The bar 25 extends laterally to each side of the tractor, providing means for mounting implements at the front of the tractor and at each side thereof. Two beams 26 are pivotally connected at each side of the tractor to brackets 27 mounted on the bar 25. A pair of beams at each side forms means for pivotally connecting a tool supporting structure 28. Said structure includes parallel transverse bars and longitudinally extending connecting bars. Said frame structure is pivotally connected to the beams 26, so that the entire assembly pivots about the connections of the beams. A plurality of earth working tools 29 are carried by shanks 30 mounted on the frame structure. It is to be understood that the construction at each side of the tractor is the same.

Links 31 are pivotally connected to upstanding ears 32 formed as extensions of the brackets 27. Said links are pivotally connected at their lower ends to vertical, upwardly extending plates 33 carried by the frame structure 28.

At each side of the tractor, a lifting member in the form of an inverted U-shaped bail 34 is pivotally mounted on a transverse axis. The connecting means at each end consists of a pair of upstanding ears 35 welded to the bar 25. One pair of said ears is at the outer end of the bar, and the other is near the center adjacent the side frame of the tractor. The lifting member 34 is connected by means of a pair of rods 36 with the plates 33. The connections between the rods 36 and the horizontal portion of the lifting member 34 are formed by straps 38, having two apertured ends through which the rods 36 extend and a portion intermediate the ends which extends around the horizontal portion of the lifting member. An adjustable stop 39 provides means for adjusting the rods relative to the lifting member.

To provide lifting means extending to the rear of the tractor, an extensible linkage or push beam means is connected to the horizontal portion of each of the lifting members 34 and to a bracket at the rear of the tractor. This linkage will be described in detail.

A lifting member in the form of a push pipe 40 is one of the main elements of the extensible linkage. Said pipe is connected to the horizontal portion of the lifting member 34 by a U-shaped strap 41. Said strap extends around the lifting member, which is circular in cross-section and is secured to the end of the pipe 40 by a bolt. A pin 42 extending through a slot formed in the strap 41 and into the member 34 provides means for holding the strap 41 against lateral movement while permitting the required angular movement during lifting and lowering operations.

At the rear of the tractor on each side, an inverted L-shaped bracket 43 is rigidly secured to a plate 43' which is in turn secured to a portion of the wheel housing 12. The upper end portion of said bracket extends forwardly. Two vertically extending members 44, as best shown in Figures 3, 4 and 5, are secured by rivets to the opposite sides of the upper end portion of the member 43. A member 45 formed with teeth 46 along the lower side, which may be termed as a rack, extends between the members 44 and cooperates with the member 43 to form a support for the rear end of the extensible lifting linkage.

As best shown in Figure 4, the teeth 46 of the rack engage two spaced pins 47, which are carried by axially spaced bearing portions 48. Said bearing portions are rotatably supported in openings 49 formed in the members 44. Said openings provide bearing surfaces for the member 48. A crank 50 extends from one side of the pin carrier assembly, being integrally formed with one of the bearing portions 48. A strap member 51 is fitted through the members 44. Said strap member has a lower lateral extension 53 and an upper lateral extension 54. The extension 54 passes through aligned openings 55 in the members 44. At the opposite side of the assembly, the extension 54 is provided with an upwardly bent portion 56, which lies alongside the member at that side. It will be noted that the horizontal portion 54 of the strap member 51 abuts the top of the rack 45. A compression spring 57 is mounted on a guide member 58 between the lateral extension 53 and a laterally extending member 59 secured to the top of one of the members 44 at the same side as the extension 53. The spring urges the member 51 downwardly, thereby acting to resiliently hold the rack 45 in engagement with the pins 47 and providing an irreversible mechanism for adjusting the longitudinal position of the rack 45.

The rack 45 is rigidly secured to an end member 59' formed as a casting, which is faced on the forward side to form a seat for the rear end of a cylinder 60. A gasket is utilized between the cylinder and the member 59' to form a fluid tight joint. An end member 61 is fitted against the forward end of the cylinder 60, a gasket also being utilized to seal the cylinder at this end. The two end members 59' and 61 are clamped in position against the ends of the cylinder 60 by means of stay bolts 62. There are four of the bolts 62 arranged at equally spaced intervals around the cylinder 60. The bolts extend through aligned openings formed in portions of the end members, which extend outwardly beyond the cylinder.

A piston 63 is fitted in the cylinder 60. Said piston is mounted on a piston rod 64, which slidably extends into a sleeve 65. Said sleeve is fitted into an opening formed in the end member 61 centrally thereof. The sleeve 65 slidably fits within the rear end of the push pipe 40, previously described. An abutment in the form of a plug 66 is positioned in the pipe 40 and secured therein at a fixed location by a pin 67. Said abutment is positioned to be engaged by the end of the piston rod 64 when the piston is moved to the left from the position shown in Figure 3. As the piston moves, the pipe 40 is moved in a forward direction, thereby lifting the implements at the front end of the tractor. It is to be understood that the construction at each side of the tractor is identical for lifting the forward implements at each side of the tractor. When the piston moves to the rear, the pipe 40 slides rearwardly over the sleeve 65 until it abuts the member 61.

The end member 61 is provided with spaced, upwardly extending ears 61a. A latch bar 61b is pivotally supported by a pivot pin extending through aligned openings in the ears 61a, as shown in Figures 3 and 7. Said latch bar is normally in the position shown in Figure 3. When it is desired to mechanically lock the implement in lifted position, the bar 61b is manually swung into a forwardly extending position. When the hydraulic cylinder moves the pipe to the end of its stroke, the bar engages the end of the pipe and holds it in that position until manually disengaged.

For supplying fluid to the cylinder 60, a fluid conduit in the form of a pipe 68 is fitted through an opening 69 in the end member 61 and is threaded into a bore 70 formed in the end member 59. Said member is formed with a recessed chamber 71, which extends downwardly to communicate with the bore 70. A flexible conduit 68' is connected to the pipe 68 and to the conduit 22 for delivering fluid thereto.

The rack 45 and the adjusting means therefor has been previously described. The action of the lifting cylinder is always the same in the respect that the extensible linkage of which it is a part is extended the same distance. The height to which the implements are raised or lowered is controlled, however, by adjustment of the rack 45 by means of the manual adjusting crank 56.

The cylinder for regulating the rear implement is similar to the cylinders for adjusting the forward implements. The same reference characters primed are utilized for said cylinder, the end members and the stay bolts. The end member 59'' is pivotally connected to a down turned end portion of an L-shaped member 72. Said member is rigidly secured to the horizontal portion of the member 43, extending forwardly therefrom. A conduit 73, connected to the conduit 23, is shown for delivering liquid under pressure to the cylinder which adjusts the rear implement. The piston rod 64' of said cylinder reciprocates in the sleeve 65' to engage a stop 66' mounted on the rear end of the pipe 40'. The pipe 40' is pivotally connected to the bell crank 74 by a bolt 74', said bell crank being pivoted on the member 43 at 43''.

The bell crank 74 is connected by a pair of members 75 with a manually adjustable unit. Said unit is in principle of operation the same as the unit shown in Figure 5, although it differs somewhat in structural details, said unit including a guide member 76. An adjusting crank 77 is operable to rotate a carrier 78, on which two pins 79 are mounted. Said pins engage the teeth 79' of a rack 80. The crank arm is carried by rockable members 81 pivoted on the guide 76 and on the members 75, as clearly shown in Figure 6, and the pins are maintained against the teeth on the rack by means of a spring 82 abutting extensions of the members 81. By means of this adjustment, the implement may be vertically moved to adjust soil working depth or to adjust the maximum height of lift. By providing a sufficient length of rack, the implement may be entirely lifted by means of the crank 77.

The rear implement is carried by frame structures 83, which at each side of the tractor are rigidly attached to the plates 43'. The details of this construction will not be described, as it is rigid with respect to the tractor and as the particular construction is not involved in this invention.

Implement beams 84, connected at laterally spaced points to the lower portion of the structures 83, carry a transverse tool supporting bar 85.

A number of soil engaging units 86 are shown mounted on the tool bar 85. For applying spring pressure downwardly against the tool bar 85, pressure rods 87 are utilized. Said rods are connected to portions of the frame structures 83 and slidably extend through apertured brackets 88 mounted on the tool bar 85. Springs 89, abutting the brackets 88 and adjustable stops 90 on the rods 87, provide means for adjustably regulating the spring pressure against the tool bar. The springs 89 are sufficiently light to allow compression thereof during lifting of the implement.

A transverse rock-shaft 91 is mounted on rearward extensions of the implement supported structures 83. Said rock-shaft is provided with two rearwardly extending arms 92, which are connected by means of lifting rods 93 with the tool bar 85. The rods 93 slidably extend through trunnion blocks 94 carried by the arms 92, whereby the tool bar may float up and down during operation against the pressure of the springs 89. Pins 95 at the upper end of the lifting rods 93 provide stops which are engaged by the trunnion blocks 94 when the rock-shaft is rotated to move the arms 92 in an upward direction.

The rock-shaft 92 is provided with a third arm 96 by which the rack 80 is pivotally connected with the hydraulic cylinder and the rock-shaft 91.

The operation of the hydraulic lifting units has been described in connection with the description of the component parts thereof. One of the principal features is the provision of independent lifting means for implements at either side of the tractor at the forward end or implements at the rear of the tractor. It is not necessary during normal operation to utilize the hand adjustment which is provided in connection with each lifting cylinder. The hand adjustment, however, provides means, when found necessary, for adjusting the maximum ground working depth of the soil engaging elements. The hand adjustments are also effective for lifting the implements to the maximum height permitted by the linkages and the tractor elements which may be engaged by the implements for transport purposes.

It is to be understood that applicant has disclosed and claimed only a preferred embodiment of his improved hydraulically controlled, extensible linkage for lifting and adjusting the soil working depth of tractor attached implements, and that he claims as his invention all modifications falling within the scope of the appended claims.

What is claimed is:

1. In a tractor propelled implement, the combination with a tractor of an implement connected to the tractor adjacent the front thereof for vertical movement with respect thereto, horizontally extensible push beam linkage having one member connected to the tractor adjacent the rear thereof and a second member telescopically related to the first member and connected to the implement adjacent the front of the tractor, power actuated means carried by the linkage for moving said telescopically related members relative to each other thereby altering the effective length of said linkage to move the implement in one direction, and auxiliary manually operated means for shifting the connecting point of the member at the rear of the tractor for adjusting the effective length of said linkage to thereby adjust the extreme up and down positions of the implement independently of the power actuated lifting means.

2. In a tractor propelled implement, the combination with a tractor having implement supporting means thereon, of an implement pivotally connected to said supporting means for vertical movement relative to the tractor, and lifting linkage connected to the implement and to the tractor, said linkage including a hydraulically operated cylinder having a piston and a piston rod connected thereto and extending from the cylinder, a guide sleeve through which the piston rod extends rigidly secured to the cylinder, and a push pipe telescopically receiving said sleeve, said pipe being provided with a stop engageable by the piston rod whereby movement of the piston in one direction moves the push pipe relative to the cylinder.

3. In a tractor propelled implement, the combination with a tractor having implement supporting means at the front end, of an implement pivotally connected to said supporting means for vertical movement relative to the tractor, and a longitudinally extending lifting linkage connected to the implement and to the tractor at the rear thereof, said linkage including a hydraulically operated cylinder having a piston and a piston rod connected thereto and extending from the cylinder, a guide sleeve through which the piston rod extends rigidly secured to the cylinder, and a push pipe telescopically receiving said sleeve, said pipe being provided with a stop engageable by the piston rod whereby movement of the piston in one direction moves the push pipe relative to the cylinder.

4. In a tractor propelled implement, the combination with a tractor having implement supporting means thereon, of an implement pivotally connected to said supporting means for vertical movement relative to the tractor, and lifting linkage connected to the implement and to the tractor, said linkage including a hydraulically operated cylinder, means for connecting said cylinder to the tractor incorporating manually operable adjusting means for bodily moving the cylinder with respect to the tractor, said cylinder having a piston and a piston rod connected thereto and extending from the cylinder, a guide sleeve through which the piston rod extends rigidly secured to the cylinder, and a push pipe telescopically receiving said sleeve, said pipe being provided with a stop engageable by the piston rod.

5. In a lifting device for tractor mounted implements, and in combination with a tractor mounted implement and a tractor, a supporting structure mounted on the tractor, a longitudinally and horizontally extending adjusting bar, manually operable means for adjustably mounting said bar on the supporting structure, a hydraulic cylinder including a piston and a piston rod rigidly connected at one end to said bar, a guide pipe rigidly connected to the other end of the cylinder, said piston rod slidably extending through said pipe, lifting means including a pipe connected to the implement for adjusting the vertical depth thereof, said pipe being slidably mounted over the first named pipe, and a stop mounted in said second named pipe and positioned to be engaged by the piston for moving the lifting pipe relative to the cylinder.

6. In a tractor propelled implement, the combination with a tractor having implement supporting means at the front end, of an implement pivotally connected to said supporting means for vertical movement relative to the tractor, and lifting linkage connected to the implement and to the tractor adjacent the rear end thereof, said linkage including a hydraulically operated cylinder, means for connecting said cylinder to the tractor incorporating manually operable adjusting means for bodily moving the cylinder with respect to the tractor, said cylinder having a piston and a piston rod connected thereto and extending from the cylinder, and a guide sleeve through which the piston rod extends rigidly secured to the cylinder and push pipe extending longitudinally along the tractor, said push pipe telescopically receiving said sleeve and being provided with a stop engageable by the piston rod.

7. A tractor attached implement comprising, in combination with a tractor having implement supporting means at the rear thereof, an implement connected to the supporting means at the rear of the tractor for vertical movement with respect thereto, an upwardly extending supporting bracket rigidly connected to the tractor adjacent the rear end thereof, a hydraulic cylinder pivotally connected at one end to said bracket, a lifting lever pivoted on said bracket, said cylinder including a piston and a piston rod extending therefrom and pivotally connected to the lifting lever, and a manually adjustable lifting linkage connected to said lifting lever and to the rear implement.

8. A tractor attached implement comprising, in combination with a tractor having implement supporting means at the rear thereof, an implement connected to the supporting means at the rear of the tractor for vertical movement with respect thereto, an upwardly and forwardly extending supporting bracket rigidly connected to the tractor adjacent the rear end thereof, a hydraulic cylinder pivotally connected at one end to said bracket adjacent the forward end, a lifting lever pivoted on said bracket at the rear thereof, said cylinder including a piston and a piston rod extending therefrom connected to transmit force to the lifting lever, and a manually extensible lifting linkage connected to said lifting lever and to the rear implement.

9. A tractor attached implement comprising, in combination with a tractor having implement supporting means at the front and rear thereof, an implement connected to the supporting means at the front of the tractor for vertical movement with respect thereto, an implement connected to the supporting means at the rear of the tractor for vertical movement with respect thereto, an upwardly extending supporting bracket rigidly connected to the tractor adjacent the rear end thereof, a hydraulic cylinder pivotally connected at one end to said bracket, a lifting lever pivoted on said bracket, said cylinder including a piston and a piston rod extending therefrom and pivotally connected to the lifting lever, a manually adjustable lifting linkage connected to said lifting lever and to the rear implement, a lifting cylinder connected by manually adjustable means to said bracket, a piston in said cylinder, a piston rod extending from the cylinder, a forwardly extending lifting member engageable by said rod and adapted to be moved longitudinally of the tractor by movement of the piston, and a lifting linkage connecting said pipe and the implement at the forward end of the tractor.

10. A tractor attached implement comprising, in combination with a tractor having implement supporting means at the front and rear thereof, an implement connected to the supporting means at the front of the tractor for vertical movement with respect thereto, an implement connected to the supporting means at the rear of the tractor for vertical movement with respect thereto, an upwardly extending supporting bracket rigidly connected to the tractor adjacent the rear end thereof, a hydraulic cylinder pivotally connected at one end to said bracket, a lifting lever pivoted on said bracket, said cylinder including a piston and a piston rod extending therefrom and connected to transmit force to the lifting lever, a manually adjustable lifting linkage connected to said lifting lever and to the rear implement, a second hydraulic cylinder connected by manually adjustable means to said bracket, a piston in said cylinder, a piston rod extending from the cylinder, a forwardly extending lifting member engageable by said rod and adapted to be moved longitudinally of the tractor by movement of the piston, and a lifting linkage connecting said pipe and the implement at the forward end of the tractor.

11. A tractor attached implement comprising, in combination with a tractor having implement supporting means at the front and rear thereof, an implement connected to the supporting means at the front of the tractor for vertical movement with respect thereto, an implement connected to the supporting means at the rear of the tractor for vertical movement with respect thereto, an upwardly and forwardly extending supporting bracket rigidly connected to the tractor adjacent the rear end thereof, a hydraulic cylinder pivotally connected at one end to said bracket adjacent the forward end, a lifting lever pivoted on said bracket at the rear thereof, said cylinder including a piston and a piston rod extending therefrom connected to transmit force to the lifting lever, a manually extensible lifting linkage connected to said lifting lever and to the rear implement, a second hydraulic lifting cylinder connected by manually adjustable means to said bracket, a piston in said cylinder, a piston rod extending from the cylinder, a forwardly extending lifting member telescopically receiving said rod and adapted to be moved longitudinally of the tractor by movement of the piston, and a lifting linkage connecting said pipe and the implement at the forward end of the tractor.

12. The combination with a tractor having soil engaging units supported on the forward portion of the tractor at each side and adjusting means for said units including extensible lift bars extending rearwardly from the units and connected to manual adjusting elements on the rear portion of the tractor and fluid-actuated expansible means operable to extend the lift bars axially independently of the manual adjusting elements, and control means on the tractor adjacent the manual adjusting elements for governing the fluid pressure in said expansible means.

13. In a tractor propelled implement, the combination with a tractor having implement supporting means thereon, of an implement pivotally connected to said supporting means for vertical movement relative to the tractor, and lifting linkage connected to the implement and to the tractor, said linkage including a hydraulically operated cylinder having a piston and a piston rod connected thereto and extending from the cylinder, a guide sleeve through which the piston rod extends rigidly secured to the cylinder, a push pipe telescopically receiving said sleeve, said pipe being provided with a stop engageable by the piston rod whereby movement of the piston in one direction moves the push pipe relative to the cylinder, and a manually engageable latch carried by the cylinder and shiftable to engage the push pipe for locking the linkage in extended position.

14. In a tractor implement, the combination with the tractor of an implement mounted for movement at one location of the tractor, a horizontally extensible push beam means connected to the implement to lift the same and including means for extending the same to move the implement, and means for adjustably connecting the push beam means at another location on the tractor spaced horizontally from the implement to adjust the extreme up and down positions of the implement independently of the means for extending the push beam means.

15. In a tractor implement, the combination with the tractor of an implement mounted for vertical movement on the forward end of the tractor, a lifting member mounted on the tractor in substantially vertical alinement with the implement and connected therewith to lift the same, a horizontally extensible push beam means connected to the lifting member and extending rearwardly along the tractor including means for extending the same to move the implement, and means for adjustably connecting the push beam means to the tractor to adjust the extreme up and down positions of the implement independently of the means for extending the push beam means.

16. In a tractor implement, the combination with the tractor of an implement mounted for vertical movement on the forward end of the tractor, a lifting member mounted on the tractor above the implement and connected therewith to lift the same, an extensible push beam means connected to the lifting member and extending rearwardly along the tractor including power actuated means for extending the same to move the implement, and manually operated means near the rear of the tractor for adjustably connecting the push beam means to the tractor to adjust the extreme up and down positions of the implement independently of the power actuated means.

17. In a tractor implement, the combination with the tractor of an implement mounted for movement at the forward end of the tractor, a horizontal extensible push beam means connected to the implement to lift the same including power actuated means for extending the same to move the implement, and manually operated means for adjustably connecting the push beam means at the rear of the tractor near to the operator's station to adjust the extreme up and down positions of the implement independently of the power actuated means.

18. In combination, a tractor, an implement mounted for movement on the tractor, extensible linkage connected to the implement and to the tractor including elements adapted to overlap portions of each other, and a hydraulic means carried by one of the elements having a piston rod adapted to extend considerably through the overlapped portions of the elements for engagement with the other element to extend the elements and to move the implement.

19. In combination, a tractor, an implement mounted on the tractor for movement, a bracket rigidly connected to the tractor, a hydraulic cylinder pivotally connected at one end to the bracket, a lifting lever pivoted on said bracket, said cylinder including a piston and piston rod extending therefrom and connected to transmit force to the lifting lever, and means for connecting the lifting lever to the implement to move the same.

20. In combination, a tractor, an implement mounted on the tractor for movement, a bracket rigidly connected to the tractor, a hydraulic cylinder pivotally connected at one end to the bracket, a lifting lever pivoted on said bracket, said cylinder including a piston and piston rod extending therefrom and connected to transmit force to the lifting lever, and a manually extensible lifting linkage connected to the lifting lever and to the implement to move the same.

21. A tractor attached implement comprising, in combination with a tractor having an operator's station at the rear of the tractor and implement supporting means at the front and rear thereof, an implement connected to the supporting means at the front of the tractor for vertical movement with respect thereto, an implement connected to the supporting means at the rear of the tractor, an upwardly extending bracket rigidly connected to the tractor near to the operator's station thereon, push beam means connected at one end to the front implement, means for adjustably connecting the other end of the push beam to the bracket including a manually operable part carried by the bracket, a lifting lever pivotally mounted on the bracket, hydraulic means connected at one end to the bracket and at its other end to the lifting lever to transmit force thereto, and manually adjustable lifting linkage for connecting the lifting lever to the rear implement to move the same.

22. A tractor attached implement comprising, in combination with a tractor having implement supporting means at the front and rear thereof, an implement connected to the supporting means at the front of the tractor for vertical movement with respect thereto, an implement connected to the supporting means at the rear of the tractor for vertical movement with respect thereto, a bracket rigidly connected to the tractor at the rear thereof, push beam means connected at one end to the bracket for adjustment relative thereto and to the implement at the front of the tractor to move the same, a lifting lever pivoted on said bracket, hydraulic means connected at one end to the bracket and at its other end to the lifting lever to transmit force thereto, and means for connecting the lifting lever to the rear implement to move the same upon being actuated by the hydraulic means.

23. In combination, a tractor having an operator's station and implement supporting means at the front and rear thereof, an implement connected to the supporting means at the front of the tractor for vertical movement with respect thereto, an implement connected to the supporting means at the rear of the tractor, a separable upwardly extending bracket adapted to be clamped to the tractor near to the operator's station, an extensible push beam means interconnecting the front implement and the bracket including means for extending the same to move the front implement, a lifting lever pivotally mounted on the bracket, means for transmitting movement carried by the bracket and adapted to transmit force to the lifting lever, and means for connecting the lifting lever to the rear implement to move the same.

24. In combination, a tractor having an operator's station, an implement mounted for movement on the front of the tractor, an extensible push beam means connected to the implement to move the same and extending rearwardly along the tractor to a point near to the operator's station, including means for extending the same to effect movement of the implement, and manually responsive means accessible from the operator's station for locking the push beam in its extended position to render the extending means ineffective.

25. In combination, a tractor having an operator's station, an implement mounted for movement at the front of the tractor, an extensible push beam means connected to the implement to move the same and extending rearwardly along the tractor to a point near to the operator's station comprising overlapping members and means for extending the members to effect movement of the implement, and manually responsive means for locking the members in the extended position carried by the more rearward extending member to be accessible from the operator's station.

26. In combination, a tractor having an operator's station, an implement mounted for movement on the front of the tractor, an extensible push beam means connected to the implement to move the same and extending rearwardly along the tractor to a point near to the operator's station, means associated with the push beam means for extending the same to effect movement of the implement, and manually responsive means accessible from the operator's station for locking the extensible push beam means.

27. In combination, a tractor having an operator's station, an implement mounted for movement on the front of the tractor, an extensible push beam means connected to the implement to move the same and extending rearwardly along the tractor to a point near to the operator's station comprising telescopically fitting members, piston means within one of said members so associated with the other member as to extend the member to move the implement, and manually responsive means accessible from the operator's station carried by one of the members and adapted to engage the other member to lock the members when they are extended.

28. In combination, a tractor, an implement mounted for movement on each side of the tractor and near to the front thereof, extensible push beam means for each implement extending rearwardly along the sides of the tractor having associated power means for extending the same to move their respective implement, power take-off means adapted to deliver power from the tractor and when connected to both of the extending power means to effect actuation of the same in unison, control means for making the power take-off means effective, and individual locking means for each of the extensible means to selectively render ineffective one or both of the power extending means.

ALEXUS C. LINDGREN.